United States Patent Office 3,777,018
Patented Dec. 4, 1973

3,777,018
COMPOSITIONS CONTAINING POLYENIC MACROLIDE AND ARYL DERIVATIVE OF ALIPHATIC ACID AND METHOD FOR TREATING HYPERLIPIDAEMIA
Harry W. Gordon, Bronx, N.Y., and Carl P. Schaffner, Trenton, N.J., assignors to Julius Schmid Inc., New York, N.Y.
No Drawing. Continuation-in-part of application Ser. No. 627,313, Mar. 31, 1967, now U.S. Patent No. 3,627,879. This application July 7, 1969, Ser. No. 839,617
The portion of the term of the patent subsequent to Dec. 14, 1988, has been disclaimed
Int. Cl. A61k 21/00
U.S. Cl. 424—117    6 Claims

ABSTRACT OF THE DISCLOSURE

Orally administered compositions for treating hypercholesterolemia are described herein, these compositions comprising an effective dose of (1) a polyenic macrolide selected from the group consisting of candicidin, fungimycin, hamycin, trichomycin and amphotericin B and (2) an aryl derivative of an aliphatic acid. Also the method of treating hyperlipidaemia including reducing and controlling blood cholesterol and triglyceride levels in a host is described herein.

---

This application is a continuation in part of our copending application Ser. No. 627,313, filed Mar. 31, 1967, now U.S. Pat. No. 3,627,879.

This invention relates to compositions containing a polyenic macrolide compound and an aryl derivative of an aliphatic acid and the method of treating hyperlipidaemia by orally administering the same.

The implication of the blood lipids as a contributing factor in the functioning of the highly vascularized organs such as the kidneys, liver, brain, lungs, testes, heart, and other organs requiring smooth, free, sufficient blood flow has contributed to the intensive and vigorous research for agents, that will control the lipid content, including triglycerides, cholesterol, lipoproteins, etc., in the blood stream and tissues. A majority of studies have focused on cholesterol because of the substantial evidence available relating blood cholesterol levels to conditions such as atherosclerosis, arteriosclerosis and other sclerotic conditions, coronary heart disease, cerebral hemorrhage, liver and kidneys dysfunction associated with vascular obstruction, sterol calculi resulting from hypercholesterolemia, etc.

Diseases such as arteriosclerosis, which is a generic term for a number of chronic pathologic conditions, affect the intima or the media of arteries and is characterized by thickening, hardening and loss of elasticity of vessel walls, with resultant alteration in size of the lumen. Atherosclerosis, which is a form of arteriosclerosis characterized by intimal thickening due to localized accumulations of lipids, known as atheromas. Atherosclerosis is of great importance because of its predilection for coronary (cerebral) and peripheral arteries. It develops insidiously, probably due to multiple factors (metabolic, humoral and hemodynamic being of primary significance).

The earliest lesions of atherosclerosis are the subintimal fatty streaks seen in the thoracic aorta in young mammals, which either retrogress or grow larger, forming plaques. While these may involve any artery, they are most common in the aorta, coronary, cerebral, and peripheral arteries of the lower extremities. Subintimal hemorrhage or ulceration of the plaque may lead to thrombosis and occlusion of the involved vessel, resulting in a variety of symptoms and signs due to ischemia.

It is believed that B-lipoproteins are basically responsible for the disease process. These lipoproteins are a heterogeneous family of macromolecules containing protein, cholesterol, phospholipids and triglycerides in varying proportions. The chemical measurement of any of these lipids is an index of the accumulation of lipoproteins of a given density. These lipoproteins, which are essential but not solely sufficient to cause disease, interact with the arterial wall in such a way as to produce the discrete intimal lesion.

The most frequent and important cause of acute renal failures (dysfunction) is acute tubular necrosis (lower nephron nephrosis or kidney shutdown). Although the causes advanced for this condition are numerous it is postulated that lipoid material depositing on the capillary walls may also contribute. Functional renal disorders are also associated with arteriolar nephrosclerosis which consists of sclerosis of the small renal arterioles. There is also interference with the normal function of the kidney in cases of atherosclerosis in which there is a thickening of the peripheral arteries due to localized accumulations of lipids known as atheromas.

Liver dysfunction associated with vascular obstruction is often seen in obese mammals in whom it is due to excessive fat intake. Fatty infiltration of the liver can also be caused by numerous factors including chronic infections (e.g., tuberculosis), metabolic disorders (e.g. diabetes mellitus), etc. In these conditions, fatty liver probably is due to migration of fat from storage deposits.

There has also been in recent years increasing interest in the formulation of "fat-free" diets in order to control obesity and/or the amount of lipids, including cholesterol, present in the blood stream as it is well known that the ingestion of fats is one means of increasing the amount of lipids in the blood. There has been much publicity of the fact that the ingestion of fat, which essentially consists of glycerol esters of higher fatty acids which break down in the digestive tract, must be maintained at a minimum in cases where a high lipid metabolism is considered dangerous.

Despite intensive research for hypolipiodal agents, including hypocholesterolemic agents, relatively few compounds have been found which are acceptable for long-term use and even these have drawbacks. For example, natural and synthetic estrogens are known to inhibit cholesterol induced atherosclerosis in mammals. In general, however, the undesirable feminizing side effects of estrogens limit their usefulness in male mammals. These side effects have stimulated a search for "non-estrogenic estrogens" (compounds in which the sterolic effect has been separated from the estrogenic effect).

Recently it has been reported that certain aryl derivatives of aliphatic acids are effective in reducing the concentration in the blood of cholesterol and triglycerides in humans when administered in relatively high doses (i.e., 1.5 to 2.5 grams/day). According to the literature, the mechanism of action of this group of materials is believed to be through the inhibition of cholesterol synthesis in the liver. However, these materials have their drawbacks because they do not affect the cholesterol derived from the dietary fat. In fact such materials are believed to stimulate the absorption of cholesterol derived from dietary fat into the bloodstream and tissues to compensate for the reduction in cholesterol synthesis in the liver. Moreover, the high dose requirement of these materials carries with it a toxicity hazard.

It has now been discovered that serum cholesterol concentration can be effectively controlled and reduced significantly at a lower and less toxic daily dose by orally administering an aryl derivative of an aliphatic acid with a polyenic macrolide.

Accordingly, the oral administration of compositions containing (1) a polyenic macrolide selected from the class consisting of candicidin, fungimycin, hamycin, trichromycin and amphotericin B and (2) an aryl derivative of an aliphatic acid are effective in treating hyperlipidaemia in mammals, including humans by reducing and/or controlling triglycerides and cholesterol derived from endogenous and exogenous sources thereby providing an agent useful for the treatment of those conditions believed associated with the lipid metabolism.

Accordingly, one aspect of the present invention is to provide a method for treating hyperlipidaemia which comprises orally administering a composition containing an effective dose of a specific known polyenic macrolide compound and in conjunction with an effective dose of an aryl derivative of an aliphatic acid.

Another aspect of the present invention is to provide an orally administered composition for treating hyperlipidaemia comprising an effective dose of (1) a polyenic macrolide compound and (2) an aryl derivative of an aliphatic acid.

Yet another aspect of the present invention comprises effectively treating hyperlipidaemia in a host at a significantly lower and less toxic daily dose than currently used commercially available anti-hyperlipidaemia agents.

An additional aspect of the present invention relates to providing a synergistic effect in the treatment of hyperlipidaemia by combining a polyenic macrolide and an aryl derivative of an aliphatic acid.

Other aspects of the invention will be apparent from the following detailed description.

As used herein, the treatment of hyperlipidaemia is intended to include the treatment of hypercholesterolaemia, and hypertriglyceridemia in a host, as well as conditions believed associated directly or indirectly therewith.

According to the present invention, the compositions found effective for treating hyperlipidaemia in warm blooded animals comprises:
(1) a polyenic macrolide selected from the class consisting of candicidin, fungimycin, hamycin, trichomycin, and amphotericin B;
(2) a compound of the formula:

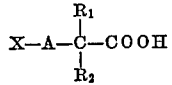

wherein A stands for oxygen or for an imino radical, $R_1$ and $R_2$ which may be the same or different, stand for hydrogen or for alkyl radicals or they may be joined to form, together with the adjacent carbon atom, a cycloalkyl ring, and X stands for a phenyl or naphthyl radical which may optionally be substituted, or the esters or salts thereof.

Each of the foregoing class of materials will now be described in detail.

Since the polyenic compounds were first discovered in 1950, a large body of literature has become available describing the extensive chemical investigation of these compounds and demonstrating that they possess generally similar chemical properties. The present broad classification of the polyenic macrolide compounds is due to the work of Oroshnik et al., in 1955 (see Polyene Antibiotics, Science, vol. 121, pp. 147–149). In 1955 only nine polyenic macrolide compounds had been isolated in reasonably pure form but since then well over fifty polyenic macrolide compounds have been reported. Undoubtedly some of these polyenes have been reported more than once under different names.

The known polyenic macrolide compounds have been produced as antibiotics by cultivation of Streptomyces in different media and by extraction of the substances from these cultures. It has been demonstrated in the literature that the known polyenic compounds are (1) of fairly high molecular weight (ca. 700–1500), (2) contain macrocylic lactones, better known as macrolides (hereinafter referred to as "polyenic macrolide compounds"), and (3) each possess a chromophore in the nucleus of from four to seven conjugated double bonds (tetraenes, pentaenes, hexaenes, and heptaenes) identified by examination of their ultra-violet absorption spectra. These conjugated systems are generally unsubstituted (except the methyl pentaenes) and either of the "all-trans" or "cis-trans" configuration. Based on the evidence available to date, it is indicated that the known polyenic macrolide compounds contain a twenty-six to a thirty-seven membered lactone ring wherein all of the ring atoms except the single oxygen atom are carbons. The evidence to date also indicates that only C, H, O, and N are present in the known polyenic macrolide compounds.

The polyenic macrolide nucleus contains a relatively planar lipophilic section (polyenic chromophore) and a less rigid hydrophilic section due to the presence of highly polar substituents, particularly hydroxyls, as well as other substituents which will be discussed in detail later herein. All of the known polyenic macrolide compounds contain at least one hydroxyl moiety and in some cases at least six hydroxyl moieties. It is difficult to estimate the precise number of hydroxyl functions present in each known polyene macrolide compound because complete, or nearly complete structures have been proposed for relatively few polyenes which are: pimaricin [Ceder et al —Acta Chem. Scand., vol. 18, pp. 72–125 (1964)]; filipin [Ceder et al.—Acta Chem. Scand., vol. 18, pp. 558–560 (1964)]; nystatin [Birch et al.—Tetrahedron Letters, vol. 23, pp. 1491–1497 (1964)]; labosin [Dhar et al.—J. Chem. Soc., p. 842 (1964)]; fungichromin [Cope et al., J. Amer. Chem. Soc., vol. 84, pp. 2170–2178 (1962)].

The distinct sections of polar and non-polar character in the polyenic macrolide nucleus result in the unique and peculiar solubility properties exhibited by the polyenic macrolide compounds. As a group of compounds the polyene macrolides generally exhibit very poor solubility in the common organic solvents such as lower alcohols, esters, ketones, ethers, etc., and are insoluble in water. The polyenic macrolides exhibit improved solubility in mixtures of lipophilic and hydrophilic solvents, e.g., aqueous solutions of lower alcohols, and are easily soluble in aqueous pyridine. Good solubility of the polyenic macrolide compound is noted in highly polar solvents such as dimethyl sulfoxide. formamide, glacial acetic acid, etc.

The following articles should be consulted for references to the discovery, isolation and chemical properties of the polyenic macrolide compounds:
(1) Vining, "The Polyene Antifungal Antibiotics," Hindustan Antibiotics Bull., vol. 3, pp. 32–54 (1960).
(2) Waksman et al., "The Actinomycetes, vol. III, Antibiotics of Actinomycetes," (Williams and Wilkins, Baltimore, 1962).
(3) Droughet, "Noveaux Antibiotiques Antifongiques," Symp. Int. Chimiotherapie, Naples, 1961, pp. 21–50 (1963).
(4) W. Oroshnik et al., "Fortschritte der Chemie Organischer Naturstoffe," vol. XXI, pp. 18–79 (1963).

The general class of polyenic macrolide compounds to which the present invention is applicable are the heptaenes. These compounds will now be discussed in greater detail by reference to the substances that fall within each of these three separate classifications.

The heptaene group of polyene macrolides are classifiable into at least five groups which may be correspondingly identified as follows:
(A) Aromatic I.—Identified as those compounds containing the heptaene macrolide nucleus, one carboxyl group, a single amino sugar moiety (mycosamine) glycosidically linked to the macrolide nucleus and an aromatic amino moiety (p-aminophenyl) aldolically linked to the macrolide nucleus. Representatives of this group are (a) candicidin which may possibly be identical to trichomycin A, hamycin (minor component), heptamycin, ascosin and levorin $A_2$; (b) trichomycin B which may possibly be identical to levorin $A_3$, hamycin (major component) and PA-150; and (c) levorin A.

(B) Aromatic II.—Identified as those compounds containing the heptaene macrolide nucleus, one carboxyl group, an amino sugar (mycosamine) glycosidically linked to the macrolide nucleus, and an aromatic amino moiety (N-methyl-p-aminophenyl) aldolically linked to the macrolide nucleus. Representative polyenic macrolides of this group are: (a) canmidycin, and (b) hamycin (minor component of hamycin complex).

(C) Aromatic III.—Identified as those compounds containing the heptaene macrolide nucleus, an aromatic amino moiety (N-methyl-p-aminophenyl), aldolically linked to the macrolide nucleus, and an amino sugar (perosamine), glycosidically linked to the macrolide nucleus. It is noted that the aromatic amino moiety just identified has previously been incorrectly reported in the literature as a p-aminobenzyl moiety. Representative of this group is fungimycin. This substance was originally identified as antibiotic No. NC 1968 and for a brief interval identified as perimycin and aminomycin.

(D) Non-Aromatic.—Identified as those compounds containing the heptaene macrolide nucleus, one carboxyl moiety and a single amino sugar (mycosamine), glycosidically linked to the macrolide nucleus. Representative of this group are: (a) candidin; (b) candidinin; (c) candidoin; (d) amphotericin B; (e) mycoheptin; (f) levorin B; and (g) antibiotic F–17–C.

(E) Poorly defined heptaenes.—A number of heptaene macrolide compounds have been described in the literature but have not as yet been sufficiently characterized as to all the substituents linked to the polyenic macrolide nucleus. These heptaene macrolides are streptomyces abikoensis heptaene, aureofacin, antibiotic 757, ayfactin A, ayfactin B, antifungin 4915, eurotin A, antibiotic AE–56, antibiotic 2814–H, grubilin, monicamycin, antibiotics A, B, and C from Streptomyces species related to S. viridans.

Although the specific polyenic macrolide compounds named above are believed well known and fully identified by their names, various publications and patents which describe these substances and indicate the manner in which they may be produced or obtained.

It will be understood that where a polyenic macrolide compound of the class herein described is identical with one of the above named compounds, but has been known by another name by reason of independent production or production in accompaniment to other antibiotics, the identification of such substances by the name set forth above is intended to mean the same compound under all other designations.

Turning now to the aryl derivatives of an aliphatic acid depicted earlier herein as having the formula

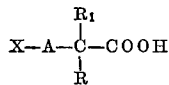

suitable lower alkyl radicals ($R_1$ and $R_2$) are methyl, ethyl, propyl. Suitable cycloalkyl radicals formed when $R_1$ and $R_2$ are joined, are cyclohexane, cyclopentane, etc. As previously indicated "X" stands for phenyl or naphthyl radicals and "A" for oxygen or an imino radical. Optional substituents in the phenyl or naphthyl radical may be halogen, alkyl, alkenyl, alkoxy, aryl, aralkyl or arylamino radicals. Preferred esters of the above described acids are the methyl, ethyl and n-propyl esters and suitable salts of the said acids may be the alkali metal or alkaline earth metal salts such as the sodium, potassium or calcium salts or, when the acids possess a strongly basic substituent, the acid-addition salts thereof such as the hydrochlorides.

Preferred compounds to be used as an active ingredient in the compositions of the invention are p-chlorophenoxyisobutyric acid and the esters and salts thereof such as the methyl, ethyl and n-propyl esters and the alkali metal and alkaline earth metal salts such as the potassium salt which is soluble in water and the calcium salt which is sparingly soluble in water.

The foregoing aryl derivatives of aliphatic acids and their process of preparation are fully identified and described in U.S. Pat. 3,262,850 the disclosure of which is incorporated herein by reference as though set forth verbatim herein.

The pharmaceutical compositions may be formulated so as to be suitable for oral administration preferably in tablet or capsule form. The compositions of this invention useful for treating hyperlipidaemia (e.g. reducing cholesterol levels) are administered by either combining the polyenic macrolide and aryl derivative of an aliphatic acid in the same pharmaceutical formulation or by administering each of these active materials separately and sequentially in a suitable carrier. Preferably the active materials are orally administered together in the same pharmaceutical formulation.

When the aryl derivative of an aliphatic acid is separately administered from the polyenic macrolide, suitable formulations in the form of capsules or tablets may be prepared in accordance with the detailed description appearing in U.S. Pat. 3,262,850 and copending application Ser. No. 627,313 filed Mar. 31, 1967, respectively, the disclosures of which are incorporated herein by reference.

When the polyenic macrolide and aryl derivatives of an aliphatic acid are incorporated in the same formulation (e.g. tablet or capsule) the dose of each of these materials is between about 25 to 250 mg. per capsule or tablet, preferably 50 mg. to 100 mg. of each material. Generally it is preferred to have about equal quantities of each of the active materials in each unit dose form, however, effective results are obtained if one material is present in a quantity of at least 20% by weight of the other material.

The active materials are administered to a host undergoing treatment for hyperlipidaemia, whether together or independently, in a total daily dose of below 1 gram per day, preferably between 400 mg. and 800 mg. per day depending on the severity of the condition and the stage and individual characteristics of each host being treated.

The following examples illustrate pharmaceutical formulations of the present invention.

EXAMPLE 1

Hard gelatin capsule available from the Robin Pharmacal Corporation (size 00) is filled with about 0.83 gram of lactose (Fast Flow available from Foremost Dairies, Inc.) and about 100 mg. of active material, the lactose and active ingredient being triturated together in a pestle and mortar until a very fine yellow amorphous powder resulted, prior to filling of the capsule. Obviously, any desired number of capsules may be filled by mixing together any amount of lactose and active ingredient in the same weight ratio indicated above so that each capsule will contain 100 mg. active ingredient; and the quantity of active ingredient may be altered, as desired, by varying the weight ratio of the indicated materials.

EXAMPLE 2

125 g. of corn starch and 2112.5 g. lactose are dried at 140° F. for 12 hours before compounding. After drying, each of these materials is sifted through a No. 14 mesh stainless steel screen. The sifted corn starch and lactose are thoroughly mixed for 30 minutes and to this mixture there is added a blended mixture of 250 g. active ingredient and 12.5 g. magnesium stearate. This admixture is blended and then compressed on a tableting machine into 5000 substantially round tablets each containing 50 mg. active ingredient and weighing about 500 mg.

EXAMPLE 3

One hundred hard gelatin capsules (size 0) are each filled with 25 mg. of candicidin and 25 mg. of clofibrate in a base containing 40 mg. potassium phosphate (monobasic) and 70 mg. calcium carbonate as buffer and lactose to fill to capacity.

The procedure for filling the capsules is as follows: weigh the quantity of candicidin potassium phosphate and calcium carbonate to fill 100 capsules with the above quantities. Sieve through a No. 60 mesh screen and blend for thirty minutes. Then weight out exact amount of clofibrate (oil) and lactose for 100 capsules and 10 gms. of anhydrous alcohol. The lactose is placed in a coating pan, and the clofibrate is dissolved in the alcohol and thereafter sprayed over the lactose while rotating the pan. The coated lactose is dried in oven at 50° C. for 18 hours. Then mix clofibrate powder with the other materials and blend for 3 hours, after which capsules are filled with powder.

The effectiveness of the compositions of the present invention in reducing serum cholesterol and triglyceride levels has been indicated in tests in laboratory mammals. In a series of studies with dogs on a high cholesterol diet, it was found that the plasma cholesterol, measured by draining blood from jugular vein, was significantly reduced after three weeks of oral administration of clofibrate (available commercially as "Astromid-S") and candicidin. The candicidin was administered in a hard capsule at a dose of 25 mg./kg. of body weight per day, three times daily and the clofibrate in a daily dose of 500 mg.

As previously indicated the compositions may be formulated into suitable forms for oral administration. If desired, enteric coated formulations may be employed for oral administration which may be prepared in accordance with the procedure described in copending application Ser. No. 627,313, now U.S. Pat. No. 3,627,879, and the prior art patents referred to in that application.

What is claimed is:

1. A process of reducing serum cholesterol in a human afflicted with hypercholesterolemia which comprises orally administering to said human pharmaceutical preparation in a solid form containing:
   (a) an effective dose for treating hypercholesterolemia of a polyenic macrolide selected from the class consisting of candicidin, fungimycin, hamycin, amphotericin B an dtrichomycin;
   (b) an effective dose for treating hypercholesterolemia of a lower alkyl ester of p-chlorophenoxyisobutyric acid selected from the class consisting of the methyl, ethyl, and n-propyl esters thereof, and said combined effective dose of said polyenic macrolide and said lower alkyl ester of p-chlorophenoxyisobutyric acid is between 400 and 800 mg. per day.

2. A process for reducing serum cholesterol levels in a human which comprises orally administering to said human a pharmaceutical preparation in solid form containing an effective dose for reducing serum cholesterol levels of
   (a) about 25 to 250 mg. of candicidin and
   (b) about 25 to 250 mg. of the ethyl ester of p-chlorophenoxyisobutyric acid.

3. A process of treating hypercholesterolemia in a human being which comprises orally administering to said human an effective dose for treating hypercholesterolemia of a pharmaceutical preperation in a solid form containing
   (a) about 25 to 250 mg. of candicidin, and
   (b) about 25 to 250 mg. of the ethyl ester of p-chlorophenoxyisobutyric acid.

4. Process of treating hypercholesterolemia as recited in claim 3 wherein said total effect of dose is no greater than 1 gram per day.

5. A pharmaceutical preparation in solid form useful for reducing serum cholesterol levels in a human comprising (a) about 25 to 250 milligrams of candicidin and (b) about 25 to 250 milligrams of the ethyl ester of para chlorophenoxyisobutyric acid.

6. A composition useful for lowering serum cholesterol levels in a solid form comprising:
   (a) about 25 to 250 mg. of a polyenic macrolide selected from the class consisting of candicidin, fungimycin, hamycin, trichomycin and amhpotericin B; and
   (b) about 25 to 250 mg. of a p-chlorophenoxyisobutyric acid and the methyl, ethyl, and n-propyl esters, potassium, sodium and calcium salts thereof.

References Cited

The Merck Index, 8th edition, Merck and Co., Inc., Rahway, N.J., 1968, p. 270.

Nature, vol. 220, Oct. 12, 1968, p. 120.

STANLEY J. FRIEDMAN, Primary Examiner

U.S. Cl. X.R.

424—119, 120, 121, 122, 300